United States Patent [19]

Ohmura

[11] Patent Number: 4,507,891
[45] Date of Patent: Apr. 2, 1985

[54] LINE GUIDE
[75] Inventor: Ryuichi Ohmura, Shizuoka, Japan
[73] Assignee: Fuji Kogyo Co., Ltd., Japan
[21] Appl. No.: 473,942
[22] Filed: Mar. 10, 1983
[30] Foreign Application Priority Data
  Mar. 17, 1982 [JP] Japan .................................. 57-41974
[51] Int. Cl.³ ............................................. A01K 87/04
[52] U.S. Cl. ....................................................... 43/24
[58] Field of Search ............................................... 43/24
[56] References Cited
U.S. PATENT DOCUMENTS
  868,563 10/1907 Holzman .................................. 43/24
  4,176,488 12/1979 Ohmura .................................. 43/24

FOREIGN PATENT DOCUMENTS
  638777 3/1962 Canada .................................... 43/24

Primary Examiner—Nicholas P. Godici
Assistant Examiner—Maureen Weikert
Attorney, Agent, or Firm—Cantor and Lessler

[57] ABSTRACT

A fishing line guide includes a line guide ring, a frame for supporting the ring and arched legs designed to extend from the frame edge and be fixed over the surface of a fishing rod. A novel line guide according to this invention is characterized in that the frame is formed into a substantial truncated cone which tapers to the guide ring.

5 Claims, 8 Drawing Figures

PRIOR ART

LINE GUIDE

BACKGROUND OF THE INVENTION

This invention relates to fishing tackle and, more particularly, to a fishing line guide.

In the prior art to which this invention belongs, a line guide as shown in FIG. 8 is disclosed in U.S. Pat. No. 4,176,488. The line guide 1' of this type includes a guide ring 2' for a fishing line which is supported in the substantially center of a frame 3', a single substantially vertical leg 4' extending from the lower end of the frame, and a pair of arched legs 5' extending downwardly, and twisted by 90°, from the upper end of the frame into contact with a fishing rod.

However, the prior guide ring has a disadvantage that the frame tends to be distorted or twisted upon receiving excessive impacts with disengagement or breaking of the supported guide ring as a consequence. This is primarily attributable to the shape of the frame.

SUMMARY OF THE INVENTION

A main object of this invention is therefore to make improvements of the prior art by varying the design of the frame to increase the strength thereof.

According to this invention, this object is achieved by the provision of said frame being formed into a substantially truncated cone that tapers to said guide ring.

BRIEF DESCRIPTION OF THE DRAWINGS

The above-mentioned object and other objects and features of this invention will become apparent from the following detailed description with reference to the accompanying drawings, in which.

PREFERRED EMBODIMENT OF THE INVENTION

A line guide generally shown at 1 is fixed over a fishing rod A by means of a string B. The line guide 1, together with its legs, is formed of a single sheet of metal as one piece.

A guide ring for a fishing line C is shown at 2, and formed of any of various materials inclusive of engineering ceramics. Around the guide ring, there is located a frame 3 formed into a substantially truncated cone that tapers to the guide ring.

Figure 1:
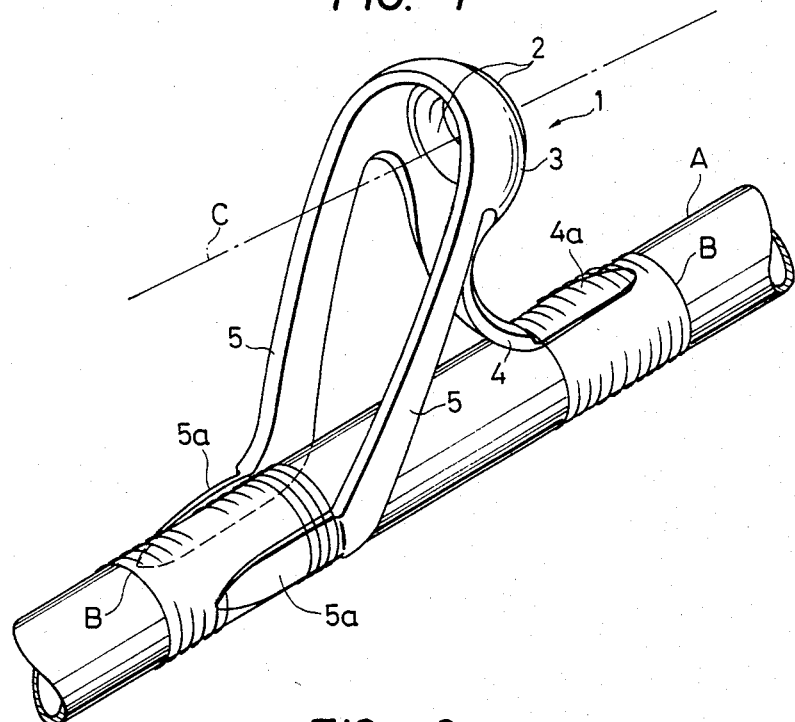
FIG. 1 is a perspective view illustrative of the line guide according to this invention.
Figure 2:
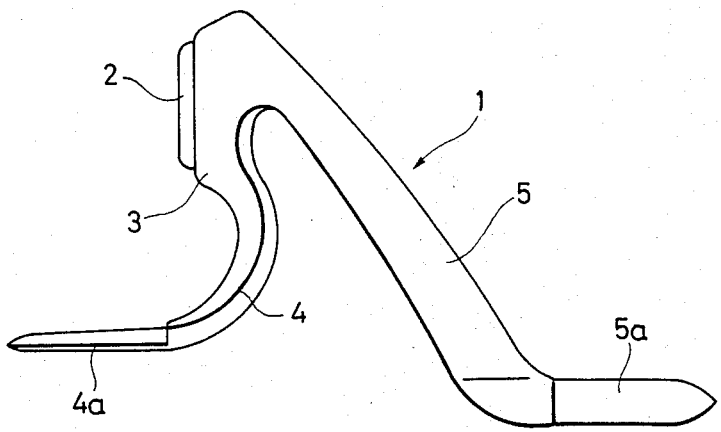
FIGS. 2-5 inclusive are side, centrally longitudinal section, plan and front views of that line guide.
Figure 3:
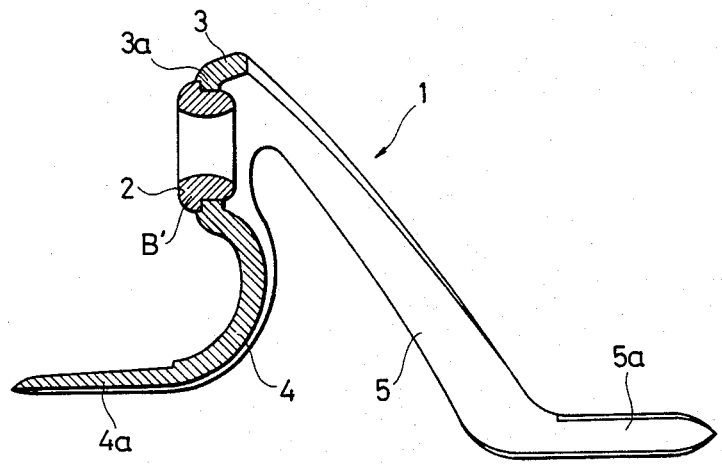
Figure 4:
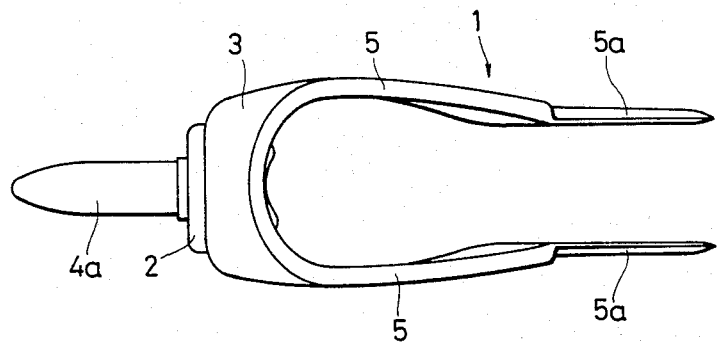
Figure 5:
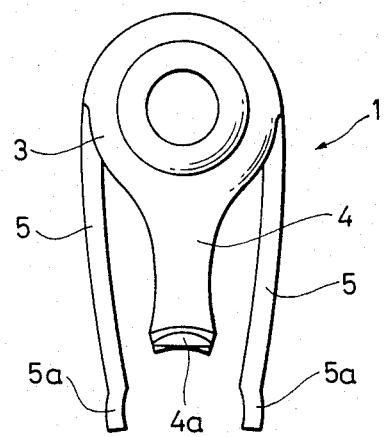

It is noted that fitting of the guide ring 2 into the frame 3 is stopped by an annular flange B' formed on the guide ring 2 and an annular indentation or recess 3a associated with the flange is formed in the front surface of the frame 3, as shown in FIG. 3.

A front concavely arcuate leg 4 to be formed with the frame as one piece extends from the middle of the lower portion of the frame. The end portion of the leg 4 to be in contact with the fishing rod is herein defined as a mounting foot 4a. The distance between the lower end of the frame and the mounting foot is adjustable, if required. For instance, the guide ring 2 may be fixed in place at a small distance with respect to the rod A.

Figure 6:
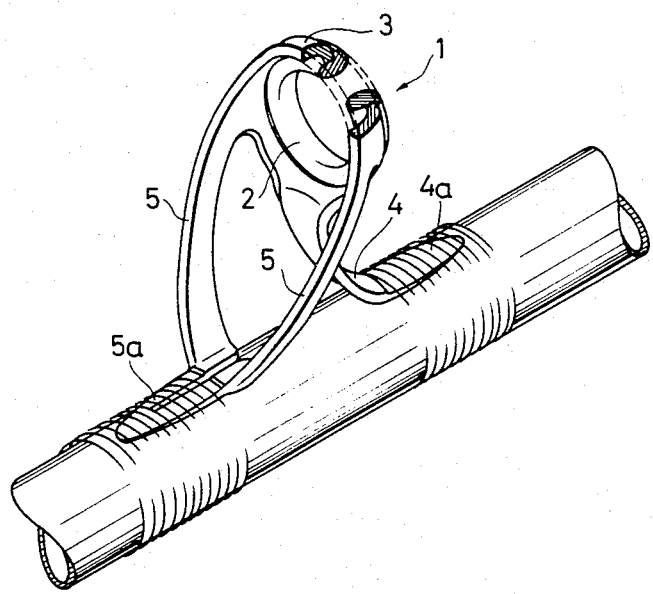
FIG. 6 is a perspective view illustrative of another embodiment of this invention.

A pair of rear legs 5 integrally extends obliquely and downwardly from the upper right and left portion of the frame 3 with their end portions being bent horizontally with respect to the rod A (referred to as the mounting feet 5a). Although the mounting feet 5a are shown to be placed on both sides of the rod A, it is possible to place them on the upper surface of the rod A by forming the mounting legs section thereof into a /\-shape. As illustrated in FIG. 6, the mounting feet 5a may be converged into one foot 5a.

With the arrangement as mentioned above, even though impacts are applied on the most projecting portion of the frame 3 during handling, there is no substantial fear of deformation of the frame 3. According to this invention, the impacts are rather dispersed into either the front leg 4 or the rear arched legs 5 and are absorbed by the front legs 4 or the rear arched leg 5, so that the guide ring 2 is protected against the said impacts.

Figure 7:
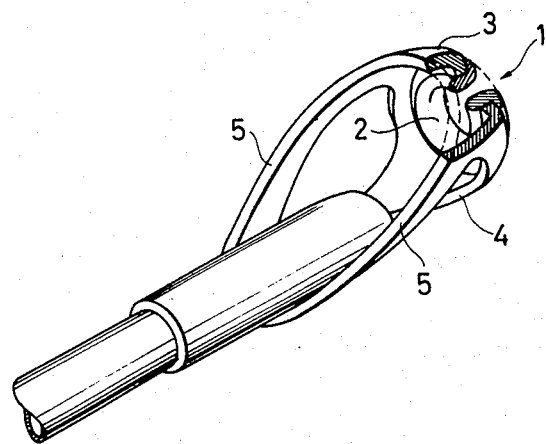
FIG. 7 is a perspective view illustrative of still another embodiment of this invention.
Figure 8:
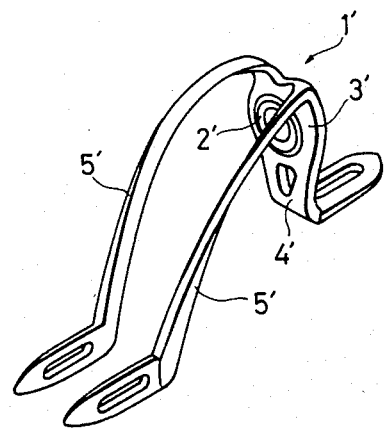
FIG. 8 is a perspective view illustrative of the prior art line guide.

While the invention has been explained with reference to its most preferable embodiment, changes or modifications may be made to the shape of the legs and the like, on condition that the novel design of the frame is maintained. For example, separate legs may be formed of a single sheet of metal or wire material, and fixed onto the frame as by brazing. The fore-and aft-arrangement of the legs is not always required. For instance, the legs may be of the design that is suitable for use with the tip top guide to be applied to the end of the rod as shown in FIG. 7.

What is claimed is:

1. A fishing line guide comprising a line guide ring, a frame for supporting said ring, legs extending from the edge of said frame and adapted to be fixed over the surface of a fishing rod, said frame being formed into a substantial truncated cone that tapers to said guide ring thereby dispersing the force of any external impact on the guide away from the guide ring and into the legs.

2. A fishing line guide as claimed in claim 1, wherein said legs comprise a single front leg depending from the bottom of said frame and a pair of rear legs extending downwardly and rearwardly from the upper portions of opposite sides of said ring.

3. A fishing line guide as claimed in claim 2, wherein said front leg is concavely arcuate.

4. A fishing line guide as claimed in claim 2, wherein said legs terminate at their lower ends in substantially horizontally disposed mounting feet.

5. A fishing line guide as claimed in claim 1, wherein said frame tapers downwardly and forwardly to said guide ring.

* * * * *